United States Patent
Ostrovsky-Berman et al.

(10) Patent No.: US 9,536,308 B2
(45) Date of Patent: Jan. 3, 2017

(54) IRREGULAR EVENT DETECTION IN PUSH NOTIFICATIONS

(71) Applicant: Verint Systems Ltd., Herzilya Pituach (IL)

(72) Inventors: Yaron Ostrovsky-Berman, Petach Tikva (IL); Ran Gur, Kiryat Ono (IL); Nir Naor, Ramat Hasharon (IL); Ran Wronsky, Rison LeZion (IL); Michael Milman, Kiryat Ono (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 373 days.

(21) Appl. No.: 14/100,895

(22) Filed: Dec. 9, 2013

(65) Prior Publication Data

US 2014/0161315 A1    Jun. 12, 2014

Related U.S. Application Data

(60) Provisional application No. 61/735,305, filed on Dec. 10, 2012.

(51) Int. Cl.
| | | |
|---|---|---|
| *G06K 9/00* | (2006.01) | |
| *G06T 7/00* | (2006.01) | |
| *G06Q 10/10* | (2012.01) | |

(52) U.S. Cl.
CPC .............. *G06T 7/004* (2013.01); *G06Q 10/10* (2013.01)

(58) Field of Classification Search
CPC combination set(s) only.
See application file for complete search history.

(56) References Cited

U.S. PATENT DOCUMENTS

| | | | |
|---|---|---|---|
| 6,400,996 B1* | 6/2002 | Hoffberg ............ | G05B 19/0426 370/218 |
| 8,010,993 B1* | 8/2011 | Bartholomay .......... | H04L 63/10 726/1 |
| 8,649,594 B1* | 2/2014 | Hua .................... | G06K 9/00771 348/143 |
| 2009/0227888 A1* | 9/2009 | Salmi .................... | A61B 5/1118 600/534 |
| 2010/0026802 A1* | 2/2010 | Titus ................. | G08B 13/19608 348/143 |
| 2014/0100956 A1* | 4/2014 | Abileah .............. | G06F 17/2235 705/14.55 |
| 2014/0149806 A1* | 5/2014 | Khalastchi ......... | G06K 9/00496 714/49 |

OTHER PUBLICATIONS

Gao "Anomaly Detection" included as "outlier_detection.pdf" which was last modified in http://www.cse.buffalo.edu/~jing/cse601/fa12/materials/ on Dec. 3, 2012.*
"outlier_detection_date_proof.pdr" included as proof of last modification date of Dec. 3, 2012.*

* cited by examiner

*Primary Examiner* — Alex Liew
(74) *Attorney, Agent, or Firm* — Meunier Carlin & Curfman

(57) ABSTRACT

Systems and methods of detecting irregular events include the extraction of values for measure in each of a plurality of notifications. The extracted values are stored in a measures database and a distribution is calculated for the values of each of the measures. The extracted values are compared to the calculated distributions to determine if an irregular event has occurred. An irregularity alert is produced if an irregular event has occurred.

25 Claims, 4 Drawing Sheets

IRREGULAR EVENT DETECTION IN PUSH NOTIFICATIONS

CROSS-REFERENCE TO RELATED APPLICATION

The present application claims priority of U.S. Provisional Patent Application No. 61/735,305, filed on Dec. 10, 2012, the content of which is hereby incorporated herein by reference in its entirety.

BACKGROUND

The present disclosure is related to automated analytics. More specifically, the present disclosure is related to the detection of irregular behavior in push notifications.

Advances have been made in the field of automated analytics in that the results from such automated analytics may be reported in a push notification system operating periodically recurring intervals, the results from the automated analysis are pushed to one or more users or recipients, such as an e-mail. This is viewed as an improvement over earlier pull reporting systems wherein a user would query the automated analysis system in order to retrieve the results of the analysis.

Due to the increases in storage power and reduced storage costs, the use of data warehouses and technologies that enable the management of video data and extraction of knowledge out of the video data has increased. In fields such as video monitoring systems, the amount of information is growing which has resulted in the transition from pulling reports to pushing reports, as noted above. While the transition from pulling reports to pushing reports has involved challenges to automation and integration from a technical standpoint, the expansion of pushing reports or notifications from an automated analysis system gives rise to further integration and workflow challenges.

When frequently pushed results are normal or uneventful, a user's own process in receiving and viewing the pushed results can adapt such that rather than reviewing the pushed results, the pushed results are not reviewed and routed to a separate folder. In such cases, the pushed results may only be reviewed by the user after the user has been notified through other channels that an undesirable event has occurred.

BRIEF DISCLOSURE

An exemplary embodiment of a method of detecting irregular events includes extracting values for measures in each of a plurality of notifications. The extracted values are stored in a measures database. A distribution for the value of each of the measures is calculated. The extracted values are compared to the calculated distribution. A determination is made if an irregular event has occurred based upon the comparison of the extracted values to the calculated distributions. An irregularity alert is produced if an irregular event is determined.

In an additional exemplary embodiment of a method of detecting irregular events in pushed analytics reports, a plurality of pushed analytics reports are automatedly generated. Each analytics report includes values for a plurality of report measures. The values for the report measures are extracted from each of the plurality of pushed analytics reports. The extracted values are stored in a measures database. A distribution of the values for each of the report measures is calculated. The extracted values are compared to the calculated distributions. A determination is made if an irregular event has occurred based upon the comparison of the extracted values to the calculated distributions. An irregularity alert is produced if an irregular event is determined.

An exemplary embodiment of a system for detection of irregular events includes a measures extractor that is configured to receive a plurality of pushed report notifications and extract a plurality of values of report measures from the plurality of pushed report notifications. A measures database operates on a computer readable medium. The measures database receives and stores the plurality of values from the measures extractor. A distribution analyzer calculates at least one distribution for each of the report measures from the plurality of values for each of the report measures. An irregularity analyzer is configured to receive values for report measures and compare the received values to the calculated at least one distribution for each of the report measures to determine if an irregular event occurs. An alerter produces an irregularity alert when a determination is made that an irregular even has occurred.

DETAILED DISCLOSURE

Figure 1:
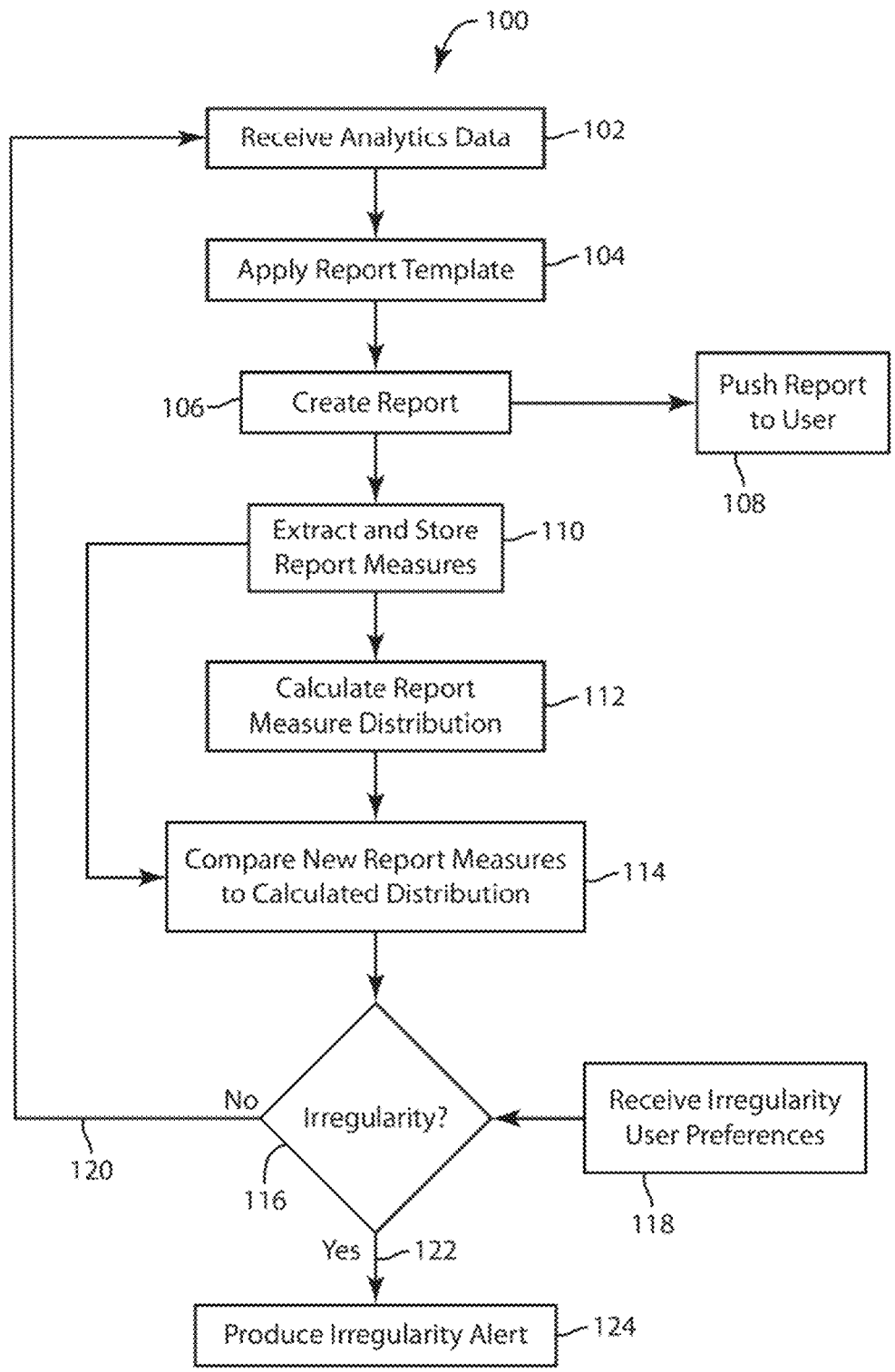
FIG. 1 is a flowchart of an exemplary embodiment of a method of irregular event detection.
Figure 2:
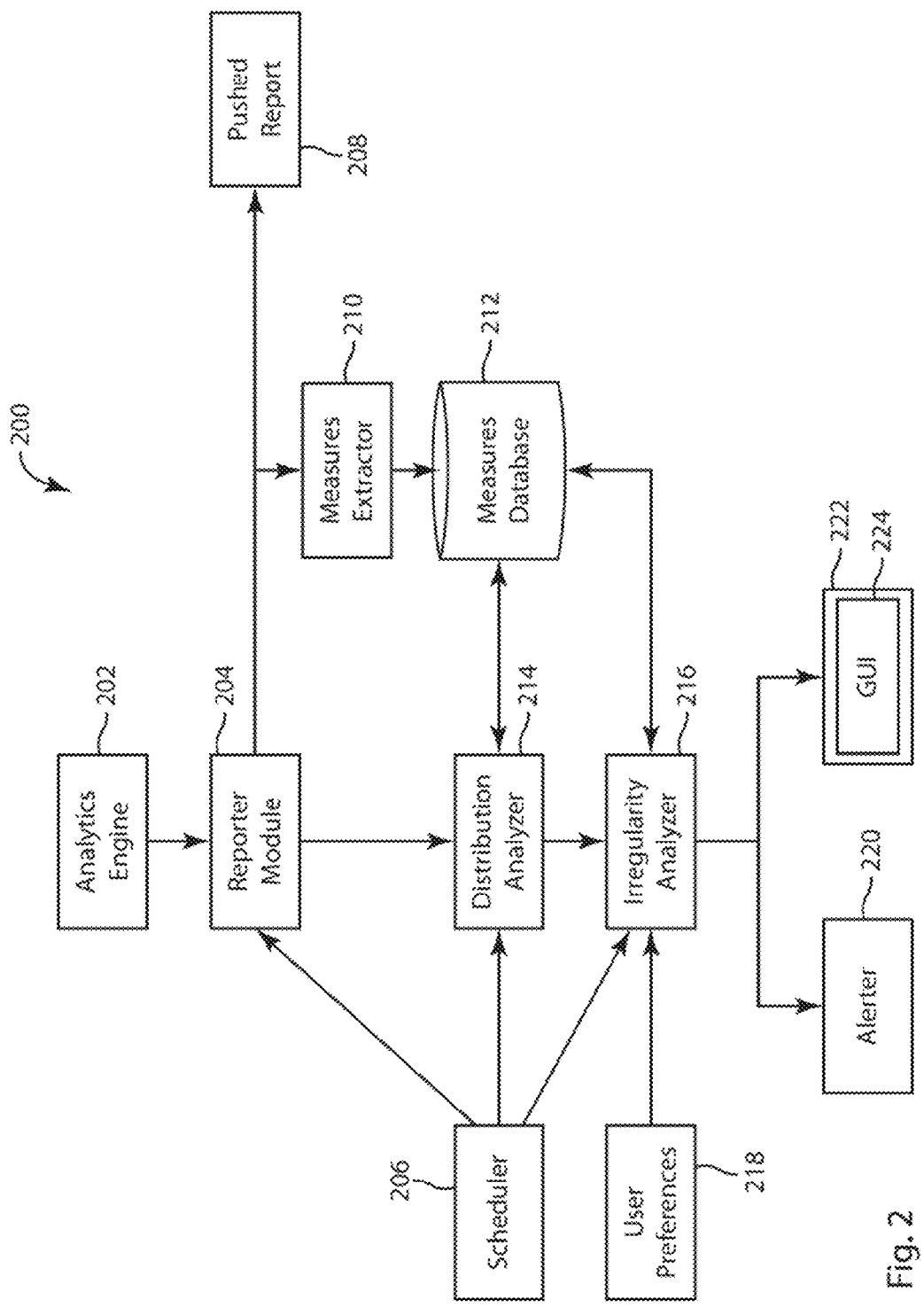
FIG. 2 is a system diagram of an exemplary embodiment of a system for irregular event detection.

FIG. 1 is a flow chart that depicts and exemplary embodiment of a method 100 of detecting irregular events in push notifications, as will be described in further detail herein. FIG. 2 is a system diagram of an exemplary embodiment of a system for detection of irregular events in push notifications, as will be described in further detail herein.

Figure 3:
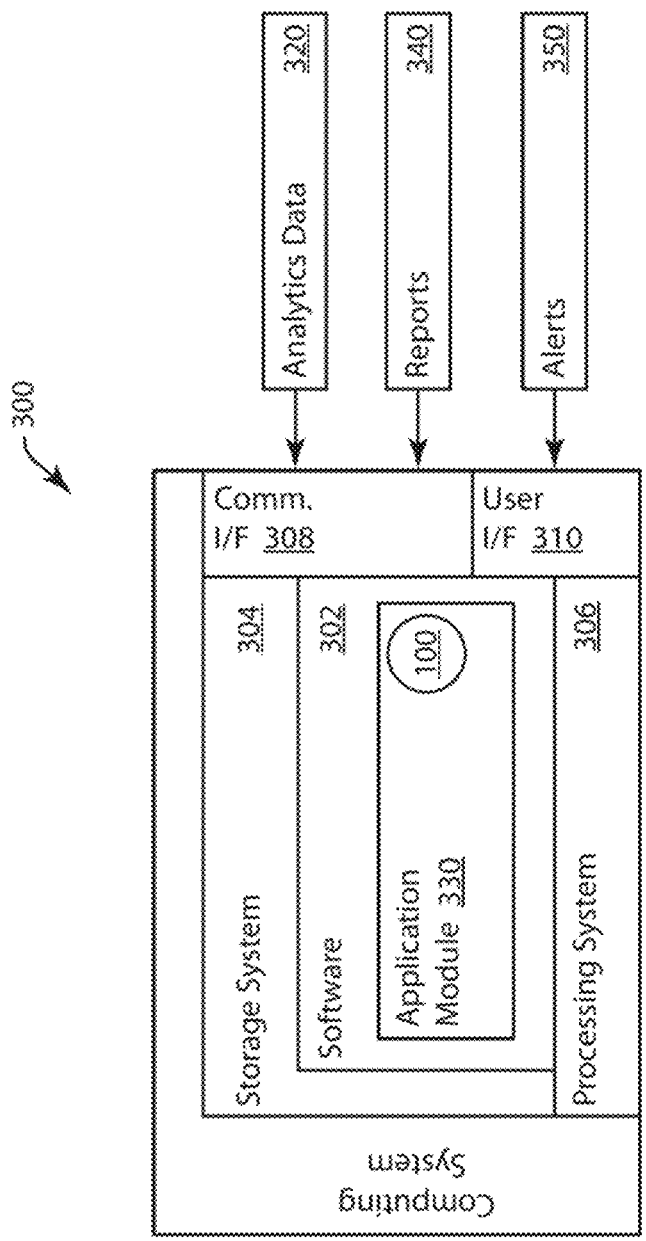
FIG. 3 is a system diagram of an exemplary embodiment of a system for irregular event detection.

FIG. 3 is a system diagram of an exemplary embodiment of a computing system 300 as may be used to implement embodiments of the method 100, or in carrying out embodiments of portions of the system 200. The computing system 300 includes a processing system 306, storage system 304, software 302, communication interface 308, and a user interface 310. The processing system 306 loads and executed software 302 from the storage system 304, including a software module 330. When executed by the computing system 300, software module 330 directs the processing system to operate as described herein in further detail in accordance with the method 100, or a portion thereof.

Although the computing system 300 as depicted in FIG. 3 includes one software module in the present example, it is to be understood that one or more modules could provide the same operations or that exemplary embodiments of the method 100 may be carried out by a plurality of modules. Similarly, while the description as provided herein refers to a computing system 300 and a processing system 306, it is to be recognized that implementations of such system can be performed by using one or more processors, which may be communicatively connected, and such implementations are considered with be within the scope of the description. Exemplarily, such implementations may be used in carrying out embodiments of the system 200 depicted in FIG. 2.

Referring back to FIG. 3, the processing system 306 can comprise a microprocessor or other circuitry that retrieves and executes software 302 from storage system 304. Processing system 306 can be implemented within a single processing device but can also be distributed across multiple processing devices or sub-systems that cooperate in executing programming instructions. Examples of processing system 306 includes general purpose central processing units, application specific processor, and logic devices, as well as any other type of processing device, combinations of processing device, or variations thereof. The storage system 304 can include any storage media readable by the processing system 306 and capable of storing the software 302. The storage system 304 can include volatile and non-volatile, removable and non-removable media implemented in any method of technology for storage of information such as computer readable instructions, data structures, program modules or other data. Storage system 304 can be implemented as a single storage device but may also be implemented across multiple storage devices or sub-systems. Storage system 304 can further include additional elements, such as a controller capable of communicating with the processing system 306.

Examples of storage media include random access memory, read only memory, magnetic disc, optical discs, flash memory, virtual and non-virtual memory, magnetic sets, magnetic tape, magnetic disc storage or other magnetic storage devices or any other medium which can be used to store the desired information and that may be accessed by an instruction execution system, as well as any combination or variation thereof, or any other type of storage medium. In some implementations, the storage media can be a non-transitory storage media. It should be understood that in no case is the storage media propagated signal.

User interface 310 can include a mouse, a keyboard, a voice input device, a touch input device for receiving a gesture from a user, a motion input device for detecting non-touch gestures, and other motions by a user, and other comparable input devices and associated processing elements capable of receiving user input from a user. User interface 310 can also include output devices such as a video display or a graphical display can display an interface associated with embodiments of the systems and methods as disclosed herein. Speakers, printers, haptic devices, and other types of output devices may also be included in the user interface 310. The user interface 310 is configured to receive user inputs 340 which in non-limiting embodiments may be irregularity user preferences as disclosed in further detail herein. It is also understood that embodiments of the user interface 310 can include a graphical display that presents the reports or alerts as described in further detail herein.

As will also be described in further detail herein, the communication interface 308 is configured to receive analytics data 320. The analytics data my exemplarily be video analytics data automatically generated by video acquisition, detection, and analysis systems and methods as may be described in further detail herein. The computing system 300 processes the analytics data according to the software 302 and as described in detail herein to produce reports 340 which may be pushed to one or more users who have been designated to receive such analytic reports. Further as described herein, the computing system 300 can output alerts 350 from the communication interface 308 such as to alert one or more personnel of a detected irregular event.

FIG. 1 is a flow chart of an exemplary embodiment of a method 100 of automated irregular event detection in push notifications. It is to be understood that the embodiment of method 100 depicted in FIG. 1 is merely exemplary and the steps and feature as disclosed herein may occur in an alternative order and steps may be added or removed and remain within the scope of the present disclosure.

An exemplary embodiment of the method 100 begins at 102 with receiving analytics data. In exemplary embodiments, the method 100 is used in conjunction with an underlying system or method of acquiring and analyzing data, exemplarily video data or audio data. In the merely exemplary embodiment of a video data acquisition and analysis system, a plurality of video cameras, which may be closed circuit television (CCTV) cameras, are deployed about an environment to be monitored, which in a non-limiting embodiment may be a retail store. As video data is acquired by each of the cameras, a video analytics engine may operate to analyze the video data on a frame-by-frame basis in order to identify objects in the video data. Further analysis by the analytics engine of the identified object can produce analytics data. In non-limiting embodiments, the analytics data may include information such as counts of people entering or leaving the retail store, counts or dwell times of people in particular departments or at particular displays, a length of time for the visit to the retail store for an identified person, counts and durations of open checkout lanes, checkout lane queue lengths, and customer wait times in checkout lanes. In many examples, the analytics data are counts or durations while these are merely exemplary and the analytics data may include other types of information from analysis of the video data.

The method 100 continues at 104 wherein a report template is applied to the analytics data. The report template may be a format and/or generalized or automated text and selected presentation formats and types for the analytics data. The report template applied at 104 may be a generalized report that seeks to convey as much of the analytics data as is available, while in other embodiments, the report template may be particularly crafted and customized by a business or user such as to present the analytics data in preferred formats and/or to highlight predetermined conditions or forms of analytics data. In still further embodiments, a plurality of report templates may exist, exemplarily for automatedly generated reports at different time intervals. In a non-limiting example a report template may exist for an hourly report and different report templates may be used for daily, weekly, or monthly reports. Each of these report templates may differ to reflect the types of analytics data that are most relevant on the selected time scale. In such embodiments, the report template to be applied at 104 may be selected based upon the timing or schedule of the automated report to be generated. At 106, the report is created according to the report template and by formatting the analytics data into one or more report measures which are preferred or preselected formats of the analytics data in the report template.

In a non-limiting example, the analytics data may provide hourly counts of people that entered the store in the last hour and people that left the store in the last hour. In embodiments, various report templates may differ in the report measures used to convey this information. This information may be reported as a report measure of person count, or exemplarily an estimated total population in the store or a net gain or loss of customers over the past hour. Alternatively, the report may use a report measure of a percentage increase or decrease in store entrances or exits by people compared to the previous hour. In still further embodiments, the report measures may include a net count or percentage change in people entering the store or leaving the store compared the previous day, week, or calculated averages. The report is created at 106 according to the report template to include the defined report measures and the automatedly created report from 106 is pushed at 108 as a notification out to the user or users designated to receive such an analytics report. The analytics reports may exemplarily be pushed to a store manager and/or data analysis personnel, while in other embodiments the report may be pushed to an executive or other management personnel of a company.

At 110, the report measures are extracted from the report created at 106 and the extracted report measures are stored in a measures database. The measures database may exemplarily be stored on any of a variety of computer readable media as described above with respect to the storage system 304 of FIG. 3. In still other embodiments, the measures database may be stored in the storage system 304 described above with respect to FIG. 3. In an embodiment, the report measures are extracted and stored in the measures database for a plurality of reports. In embodiments, the push reporting system operates to create and push reports at regular periodic intervals. These exemplary intervals may be hourly, daily, weekly, or monthly and may use a different report template for each periodic report as described above. Therefore, over time the measures database will grow with the extracted report measures resulting in historical report measures.

When a sufficient number of values for specific report measures have been extracted and stored in the measures database, then at 112 a report measure distribution can be calculated for the historical report measures. It will be understood that in embodiments a sufficient number of report measure values may exemplarily be 25 or 50 report measure values, while these are recognized as to be merely exemplary of sufficient numbers of values for the calculation of distributions. A person of ordinary skill in the art will recognize various sufficient initial amounts based upon the manner in which the distribution is calculated at 112. It will also be recognized that the report measure distribution calculated at 112 may be periodically recalculated such that the number report measure values in the historical report measures in the measures database continues to grow over time resulting in increasingly robust distribution calculations. In one embodiment, the report measure distribution is recalculated at 112 with each new created report while in alternative embodiments, a new report measure distribution is recalculated periodically, exemplarily weekly or monthly in order to update the calculated report measure distribution with new recently extracted report measures.

At 114, each of the report measure values newly extracted from the currently created report are compared to the calculated distribution for that report measure. The comparison at 114 results in a determination at 116 of whether or not an irregularity exists in one or more of the report measure values extracted from the current report. While the determination at 116 may be based at least in part upon the comparison at 114, one or more irregularity user preferences may be received at 118 which define a specificity, confidence interval, or standard deviation within the calculated distribution which is determined to be irregular for each particular report measure. Therefore, a irregularity user preference may be defined by a user or a company that exemplarily defines as irregular a customer entry count in an hourly report outside of two standard deviations of the expected number of customer entrances for an hour during that time of day. In another embodiment, the received irregularity user preferences may define a specific count range that is determined to be normal and therefore counts outside of that range are determined to be irregular.

If a report measure is determined to be normal or have no irregularity at 120 then the method 100 may return to the beginning in order to automatedly create the next sequential report. If, at 116, an irregularity is identified at 122, then at 124 an irregularity alert is produced. In exemplary embodiments, the irregularity alert may be in the form of a push notification to the same recipients to which the reports are pushed at 108, although the irregularity alert will include identifying or notable feature or flag, such as to draw the user's attention apart from the normally received push report. In another embodiment, the irregularity alert is a modified version of the report sent at 308, modified to include the alert. In alternative embodiments, the irregularity alerts are pushed to a larger number of personnel which may include management personnel or other data analysis personnel. In exemplary embodiments, the irregularity alert can be pushed to users and/or management personnel in the form of e-mail, text, or instant message communication. In still further embodiments, the irregularity alerts may be presented on a GUI as will be described in further detail herein.

In an exemplary embodiment of an implementation as disclosed herein, the irregular event detection may operate on a computer processor as a standalone logical model that works in connection with a reporting module that systematically generates and pushes analytics data reports. Embodiments of the irregular event detection method and system can automatedly run different predefined reports in different time scales according to the templating capabilities of the underlying reporter module. The irregular event detection module then leverages the reports generated by the reporter module to extract the report measures and learn the expected events (or a distribution thereof) of different measures presented in the reports. The irregular event detection module can identify and record any deviation of the analytics data from the expected distributions presented in the generated reports according to user defined sensitivity or confidence levels. Identified irregularities can be acted upon with irregularity alerts. In embodiments, the irregularity alerts can be generated in real-time or near-real-time depending upon the processing capability of the implementation of an embodiment. In further embodiments, each detected irregularity event can be translated into words and/or a diagram by applying generalized statements or report templates to the identified irregularity and can be reported to data analysis or management personnel as disclosed herein.

FIG. 2 depicts an exemplary embodiment of a system 200 for the detection of irregular events in pushed analytics reports. Embodiments of the system 200 may be implemented with one or more computing systems 300 as described above with respect to FIG. 3, and may operate to carry out embodiments of the method 100 as described above with respect to FIG. 1. The analytics engine 202 operates to receive video data and analyze the video data, exemplarily in real-time on a frame-by-frame basis in order to identify objects and durations regarding the identified objects that are provided as analytic data to a reporter module 204. The analytics data is exemplarily made up of object identification and object counts, or measured durations or intervals with respect to specific identified objects. Exemplarily, the analytics data is a count of people that enter a store or exit a store, a count of a number of people that visit a particular department or display within a store, checkout line queues, checkout line wait times, or customer dwell times at a particular display or location. However, these are intended to be merely exemplary and non-limiting on the scope of the analytics data that may be provided to the reporter module 204.

The reporter module 204 operates according to a scheduler 206 in order to periodically create various reports that convey the analytics data as report measures which are particular values produced to represent the received analytics data. It will be understood that different reports may be generated hourly, daily, weekly, monthly, etc. depending upon the report measures selected for the report and the underlying analytics data reflected by those report measures. The reporter module 204 automatedly creates a report and pushes the report 208 to one or more recipients, who may exemplarily be data analysis or management personnel for the business implementing the system 200.

The report generated by the reporter module 204 is also provided to a measures extractor 210 which extracts the report measure from the generated reports and stores the extracted report measure in a measures database 212. In an alternative embodiment, the reporter module 204 itself may also extract the report measures and provide the extracted report measures directly to the measures database 212. The extracted report measures are stored in the measures database 212 in association with a time stamp and any other user specified information or metadata regarding the specific report measure as a class. This metadata may include, but is not limited to integer/float values, minimum and maximum report measure values, seasonality or cyclicality of the report measures. Some embodiments may further include a general, known, or starting distribution for the values of a report measure, although as described herein, a distribution analyzer 214 will calculate new and updated distributions for the report measure values which are also stored in the measure database 212 as described in further detail herein.

As mentioned above, a distribution analyzer 214 retrieves all of the values for a report measure stored in the measures database 212 and calculates an expected distribution of the values for that report measure. The distribution analyzer 214 is connected to the scheduler 206 such that the distribution analyzer 214 may operate upon a predefined schedule to recalculate the distributions of each of the report measures in the measures database 121 periodically to incorporate any new report measure recently stored in the measures database 212. The distribution analyzer 214 saves the newly calculated distribution in the measures database 212. In embodiments, particularly if sufficient report measure values are available, the distribution analyzer 214 can calculate multiple distributions for each report measure exemplarily to reflect cyclical or seasonal changes exemplarily based upon the day of week, time of day, or time of year which may have a bearing upon the expected normal distribution of report measure values.

An irregularity analyzer 216 operates, once the distribution models have been established for specific report measures, to analyze each new report measure value used in a report by the reporter module 204 for irregularities. Exemplarily, each new report measure value stored at the measures database 212 is provided to the irregularity analyzer 216 along with the appropriate distribution for that report measure stored at the measures database 212. In an exemplary embodiment, the irregularity analyzer 216 measures the irregularity (e.g. P-value for a relevant equality of means test for the most recently updated distribution for that report measure). The irregularity analyzer 216 can also be connected to the scheduler 206 such that the irregularity analyzer 216 operates each time that the reporter module 204 is operated to generate a new report. The irregularity analyzer 216 may further receive user preferences 218. The user preferences 218 may define an irregularity threshold that is used by the irregularity analyzer 216 in determining whether or not the new value is irregular compared to the distribution of the report measures. The irregularity threshold may be defined as a predefined P-value threshold. The threshold may further be exemplarily defined as a standard deviation or confidence value (e.g. events outside of a 95% distribution are defined as irregular), a numerical value, or a high and/or low bound that defines an irregular event. In a still further embodiment, irregularity thresholds may be defined with a combination of measures, in a non-limiting example a normal value representative of a count of people entering a store may be any number greater than 5 and within a 95% confidence interval in the distribution. In another embodiment, the irregularity analyzer 216 also has a feedback loop to the measures database 212 in which any report measure values determined to be normal are flagged in the measures database 212 for use by the distribution analyzer 214. In such an embodiment, the distribution analyzer 214 may operate to only model normal events and therefore values that fall outside of this defined normal range would be deemed to be irregular by the irregularity analyzer.

Figure 4:
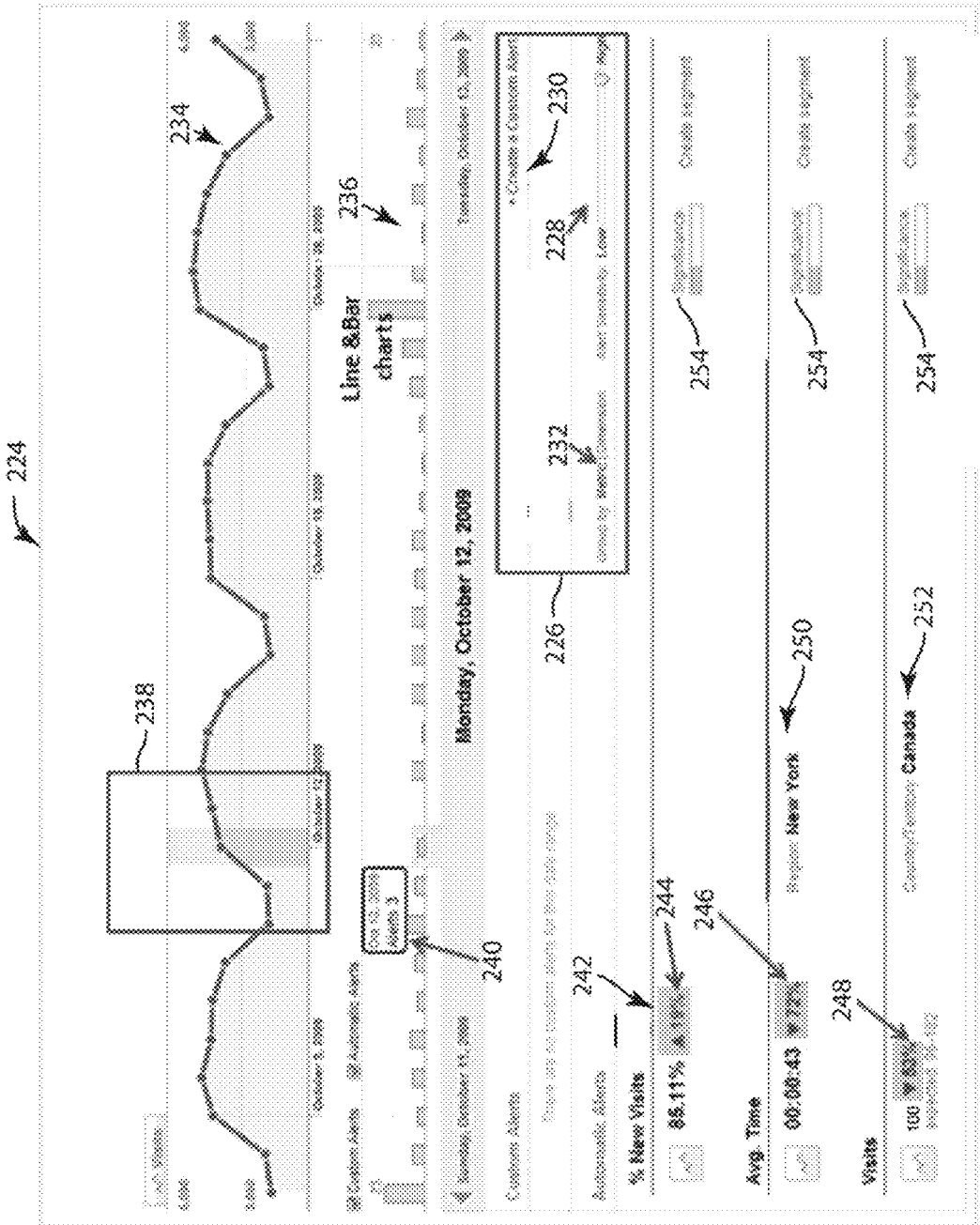
FIG. 4 depicts an exemplary embodiment of a graphical user interface in accordance with embodiments as disclosed herein.

If the irregularity analyzer 216 identifies that the current value is an irregularity, the irregularity analyzer 216 sends a notification to an alerter 220. The alerter 220 can operate to report the detected irregularity by any of a variety of known communication platforms, including e-mail, text message, other short message service (SMS) messages, or instant messaging. In another embodiment, the detected irregularity is presented on a graphical display 222 that visually presents a graphical user interface (GUI) 224 on the graphical display 222. FIG. 4 depicts an exemplary embodiment of a GUI 224 which may be presented on the graphical display 222 in accordance with the system 200 of FIG. 2 in order to present identified abnormality.

Referring now to FIG. 4, the GUI 224 is merely exemplary of features that may be found in embodiments of the GUI and is not intended to be limiting on the function or form of such GUIs as may be used in embodiments as disclosed herein.

In non-limiting embodiments, the distributions and the report measure values can be reported with line charts 234 or bar charts 236. The GUI 224 may exemplarily use shading or banding, such as depicted in reference box 238 in order to identify or highlighted detected irregularities in the report measure values. The GUI may also include features such as smart labels such that the selection of a point or bar in one of the charts creates a pop up box 240 that presents additional information, exemplarily presenting time and numerical count information represented by the line chart 234 or bar chart 236.

The GUI 224 also may operate in embodiments to facilitate the entry and receipt of user preferences exemplarily with a user preference object 226 within the GUI 224. In the user preferences object 226, a user can select buttons to adjust a distribution sensitivity 228 or to create a custom alert 230. A user may also select to group the presented results either by metric such as by similar report measures or by distribution such that that similarly distributed measures are grouped together at 232. As depicted in FIG. 4, these user inputs can be used to define irregularity conditions, which may be reported in the GUI as a listing of irregularity alerts 242.

As noted above, the report measures may present the analytics data and any irregularity alerts 242 in a variety of ways as may be determined to be the most relevant manner of presenting the analytics data. As exemplarily reference numerals 244 and 246 and 248, the analytics data and irregularity alerts can be presented in the report measures as a percentage indicating a percentage of new visits at 244 or as a duration at reference 246, or as a count of total visits at 248. Similarly, each of these can also be represented in a relative fashion, exemplarily to show a percentage increase or decrease compared to a reference value or average. While it was previously described above that a distribution analyzer may calculate distributions for a report measure at various times and dates, similarly, distributions can be calculated for specific locations or regions, if such embodiments of the system and/or method are implemented across multiple facilities. Exemplarily, a region (e.g. New York 250) may have a different distribution that values for a different region (e.g. Canada 252). In an exemplary embodiment, each of the alerts can also include a significance 254 which is indicative of an importance or a severity of the detected irregularity. Some detected irregularities may simply mean that a store is busier than normal, while other irregularities may be indicative of more significant issues. For example, while a irregularity that registers zero or very few visitors during an expected peak time of day may be an indication that the video analytics system is not operating correctly and requires maintenance, while an indication of a vast number of people entering a store, such as a convenience store at a late hour of the night when very little customer activity is expected could be indicative of criminal activity requiring further attention by a manager.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of detecting irregular events from acquired data, the method comprising:
   acquiring data from a data acquisition system, said data comprising video data;
   identifying, on a frame-by-frame basis, objects in the video data:
   automatedly producing, with the acquisition system, analytics data from the identified objects;
   formatting the analytics data into a report notification pursuant to a report template;
   extracting values of report measures from the report notification;
   transmitting the extracted values across a communications interface to a measures database;
   transmitting metadata regarding classes of report measures across a user interface to the measures database;
   storing the extracted values and the metadata in the measures database;
   calculating a distribution for the values of each of the report measures in accordance with the metadata for the class associated with each report measure;
   comparing extracted values to the calculated distributions;
   determining if an irregular event has occurred based upon the comparison of the extracted values to the calculated distributions; and
   producing an irregularity alert if an irregular event is determined.

2. The method of claim 1, wherein the irregularity alert is a pushed notification comprising a time scale set forth in an underlying report template.

3. The method of claim 1, wherein the irregularity alert is visually presented in a graphical user interface.

4. The method of claim 1, further comprising: receiving at least one user preference;
   using the at least one user preference to determine if an irregular event has occurred.

5. The method of claim 4, wherein the at least one user preference is an irregularity threshold.

6. The method of claim 1, wherein the notifications are analytics reports and the measures are report measures conveying analytics data.

7. The method of claim 6, further comprising:
   receiving analytics data;
   automatedly generating the analytics reports from the received analytics data; and
   pushing the automatedly generated analytics reports to at least one recipient.

8. The method of claim 7, wherein the analytics reports are automatedly generated by applying the received analytics data to at least one report template, and the at least one report template defines the report measures in each of the analytics reports.

9. The method of claim 8, wherein the at least one report template defines the report measures and further comprising calculating the values of the report measures from the analytics data.

10. The method of claim 7, further comprising scheduling the automated generation of the analytics reports, the calculation of the distribution for the values of the report measures, and the determination of irregular events to periodically recur.

11. A method of detecting irregular events in pushed analytics reports, the method comprising:
    automatedly generating a plurality of pushed analytics reports comprising formatting templates that are conditional upon user input, each analytics report comprising values and time stamps for a plurality of report measures;
    extracting the values and time stamps for report measures from each of the plurality of pushed analytics reports according to the user input from a user interface;
    storing the extracted values in a measures database;
    storing metadata regarding classes of report measures by transmitting the metadata across a user interface to the measures database;
    calculating a distribution of values for each of the report measures;
    storing a distribution sensitivity in accordance with said meta data;
    comparing extracted values to the calculated distributions pursuant to said distribution sensitivity:
    determining if an irregular event has occurred based upon the comparison of the extracted values to the calculated distributions; and
    producing an irregularity alert if an irregular event is determined.

12. The method of claim 11, further comprising:
    receiving at least one irregularity threshold; and
    using the at least one irregularity threshold to determine if an irregular event has occurred.

13. The method of claim 11, further comprising calculating a plurality of distribution of values for each of the report measures for different temporal durations.

14. The method of claim 11, further comprising:
automatedly generating a current analytics report comprising current values for the plurality of report measures;
extracting the current values from the current analytics report; comparing the current values to the calculated distributions; and
determining if an irregular event occurred from the comparison of the current values to the calculated distributions.

15. A system for detection of irregular events, the system comprising:
a measures extractor that is configured to receive a plurality of pushed report notifications and extract a plurality of values for report measures from the plurality of pushed report notifications;
a measures database operating on a computer readable medium, the measures database receives and stores the plurality of values from the measures extractor;
a distribution analyzer that calculates at least one distribution for each of the report measures from the plurality of values for each of the report measures;
an irregularity analyzer that is configured to utilize a feedback loop to the measures database to receive values for report measures and compare the received values to the calculated at least one distribution for each of the report measures to determine if an irregular event occurs and for values determined to be normal, flagging the values in the measures database for use by the distribution analyzer;
an alerter that produces an irregularity alert when a determination is made that an irregular event has occurred.

16. The system of claim 15, further comprising a graphical display configured to present a graphical user interface that visually presents the irregularity alert.

17. The system of claim 15, wherein the graphical user interface further visually presents the values of the report measures.

18. The system of claim 15, further comprising a reporter module that receives analytics data and applies the analytics data to at least one report template to automatedly generate pushed report notifications that comprise the plurality of values for report measures.

19. The system of claim 18, further comprising an analytics engine that is configured to receive video data and analyze the video data on a frame by frame basis to produce analytics data, the analytics engine is further configured to provide the analytics data to the reporter module.

20. The system of claim 18, further comprising a scheduler communicatively connected to the reporter module, distribution analyzer, and the irregularity analyzer, the scheduler controls the reporter module, distribution analyzer, and the irregularity analyzer to operate at predetermined intervals.

21. The method of claim 1, said data further comprising audio data.

22. The method of claim 1, said video data further comprising a time stamp transmitted via said communications interface on a frame-by-frame basis with said report measures to said measures database.

23. The method of claim 22, further comprising calculating and storing in said measures database dwell times for a location from said objects and said time stamps.

24. The method of claim 1, wherein producing the analyzing data and producing the irregularity alert occur on a real time or near real time basis.

25. The method of claim 1, further comprising automatically detecting and acquiring the video.

* * * * *